United States Patent [19]
Satoh et al.

[11] Patent Number: 4,542,526
[45] Date of Patent: Sep. 17, 1985

[54] CHARACTER RECOGNITION APPARATUS

[75] Inventors: Koji Satoh; Akihiro Ooka; Yutaka Wada, all of Osaka, Japan

[73] Assignee: Sumitomo Electric Industries, Ltd., Osaka, Japan

[21] Appl. No.: 543,817

[22] Filed: Oct. 20, 1983

[30] Foreign Application Priority Data

Oct. 21, 1982 [JP] Japan .................. 57-185839

[51] Int. Cl.⁴ .............................. G06K 9/22
[52] U.S. Cl. ........................ 382/13; 382/47; 382/59
[58] Field of Search .......... 382/3, 13, 24, 47, 21, 382/48, 55, 59; 178/18–20

[56] References Cited

U.S. PATENT DOCUMENTS

| | | | |
|---|---|---|---|
| 3,111,646 | 11/1963 | Harmon | 382/13 |
| 3,133,266 | 5/1964 | Frishkopf | 382/13 |
| 3,875,331 | 4/1975 | Hasenbalg | 382/59 |
| 4,061,998 | 12/1977 | Ito | 382/55 |
| 4,075,605 | 2/1978 | Hilley et al. | 382/48 |
| 4,180,800 | 12/1979 | Isshiki et al. | 382/59 |

FOREIGN PATENT DOCUMENTS 1281626  7/1972  United Kingdom .

Primary Examiner—Leo H. Boudreau
Attorney, Agent, or Firm—Cushman, Darby and Cushman

[57] ABSTRACT

An apparatus for recognizing a character (including an alpha-numeric character, mark or other character) written using a stylus applied to a tablet which stylus and tablet include an arrangement for providing an indication of position of the stylus with respect to a surface of the tablet. The character recognition apparatus determines the length and gradient (slope) of line segments of strokes drawn by a user which strokes combine to form characters. After determining length and gradient of a line segment, there is assigned to the line segment a distinctive code. A particular character is determined by examining the order of codes which define particular combinations of strokes. Recognition of characters is carried out in substantially real time.

3 Claims, 6 Drawing Figures

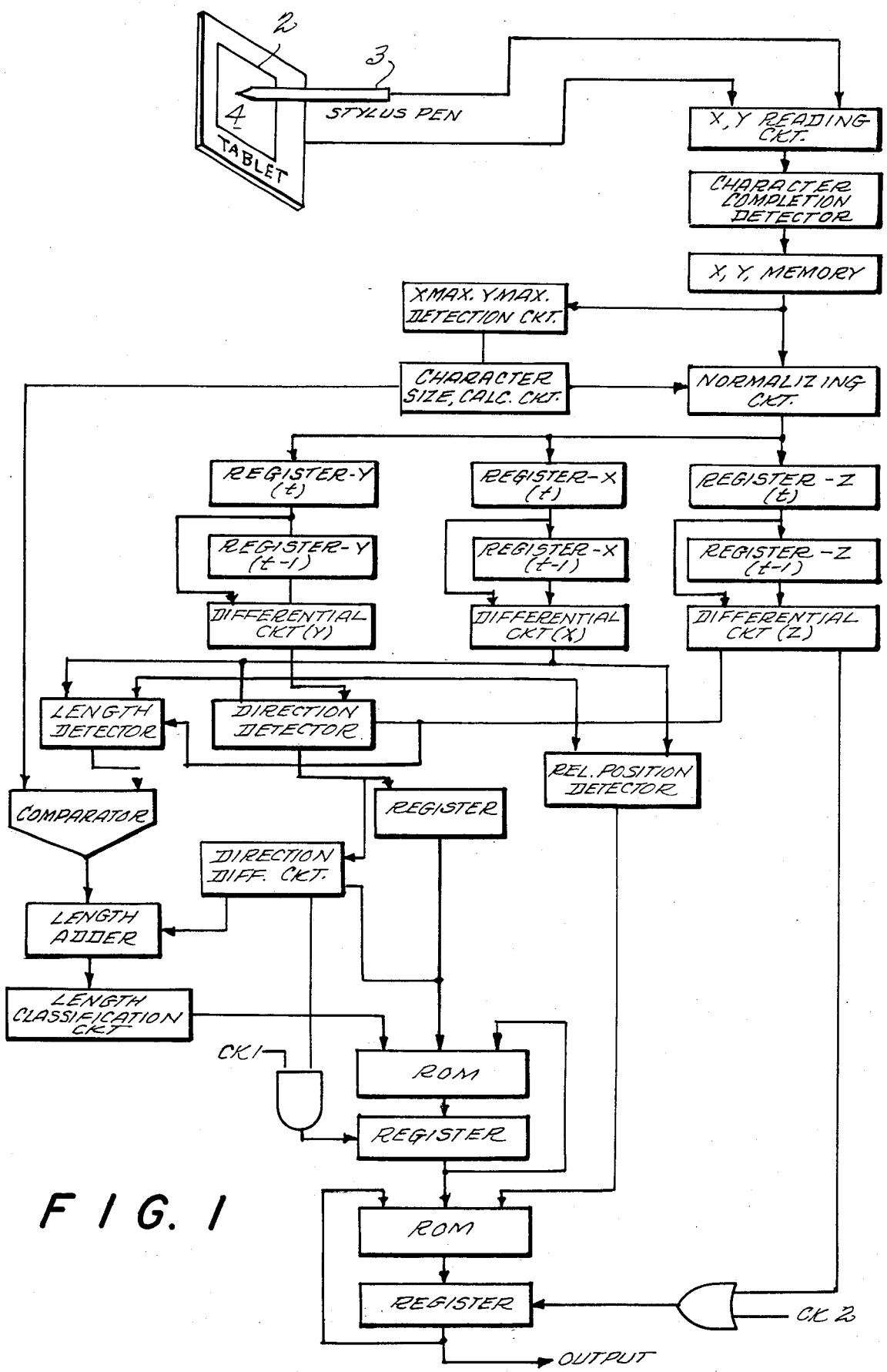
F I G. 1

FIG. 2
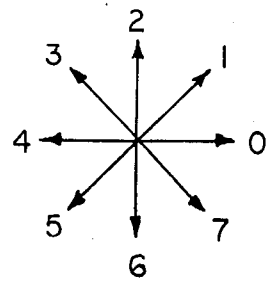
FIG. 3
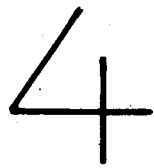
FIG. 4a
/ + — → ∠
θ=5    θ=0
L=3    L=3
FIG. 4b
|   → |
θ=6         C01
L=2

CHARACTER RECOGNITION APPARATUS

BACKGROUND OF THE INVENTION

This invention relates in general to character recognition apparatus. More specifically, the present invention provides a character recognition apparatus that operates substantially in real time to identify characters drawn using a stylus applied to a tablet. The characters can include alpha-numeric characters, marks, and the like.

Many attempts have been made to automatically recognize handwritten characters drawn using a tablet/stylus pen combination for indicating the relative position of the stylus pen with respect to the tablet. Many of such attempts have included the use of complex software for computer-aided analyzing of the characters. However, there are significant disadvantages attendant this approach. the computer software necessary for character recognition programs is extremely complex. It takes a long time to recognize any given character. This means that character recognition cannot be carried out in real time which significantly limits the application of such a program. It cannot be used "on line" without causing a user to be frustrated.

An alternative to this type of computer-aided recognition is to recognize a character by classifying various typical elements of the character and comparing them with elements predefined in a "look-up" table of elements of known characters. This approach for character recognition can be used when the character can be easily represented by such typical elements which are composed of combinations of straight lines. For such characters, relatively high accuracy of recognition can be achieved.

SUMMARY OF THE INVENTION

The present invention provides an apparatus for recognizing characters. The character can be an alpha-numeric character or mark. Recognition occurs substantially in real time as the character is written using a stylus pen on a surface of a tablet which is provided with a pen-position detector.

During movement of the pen over the tablet surface, initiation and completion of a stroke of a character is detected when the vertical position of the pen which is expressed as the Z-coordinate shifts. The end of writing a character is also detected either when the pen has moved across the tablet far beyond the distance of a normalizing size of the character or when the passage of time between the occurrence of two adjacent discontinuities of the Z-coordinate exceeds a preset value, e.g., when the stylus is lifted off the tablet for more than a predetermined time.

The length (L) and the gradient ($\theta$) of a line segment of a stroke is determined by examining the X and Y coordinates of the start and end points of the line segment. The line segments are classified into plural categories and designation codes are assigned to each line length and gradient. The particular order of occurrence of the codes identifies stroke order and hence a character. A specific character is determined by comparing the code order with those preset in a table of codes.

BRIEF DESCRIPTION OF THE DRAWINGS

FIG. 1 is a block diagram of the character recognition apparatus according to the present invention;

FIG. 2 graphically illustrates the assignment of a code for each of various line segment directions of a stroke of a character;

FIG. 3 illustrates how a character such as the numeral character "4" is composed of distinct strokes;

FIGS. 4(a) and 4(b) illustrate the step for characterizing line segments and strokes of a character according to the present invention.

DETAILED DESCRIPTION OF THE PREFERRED EMBODIMENT

Figure 5:
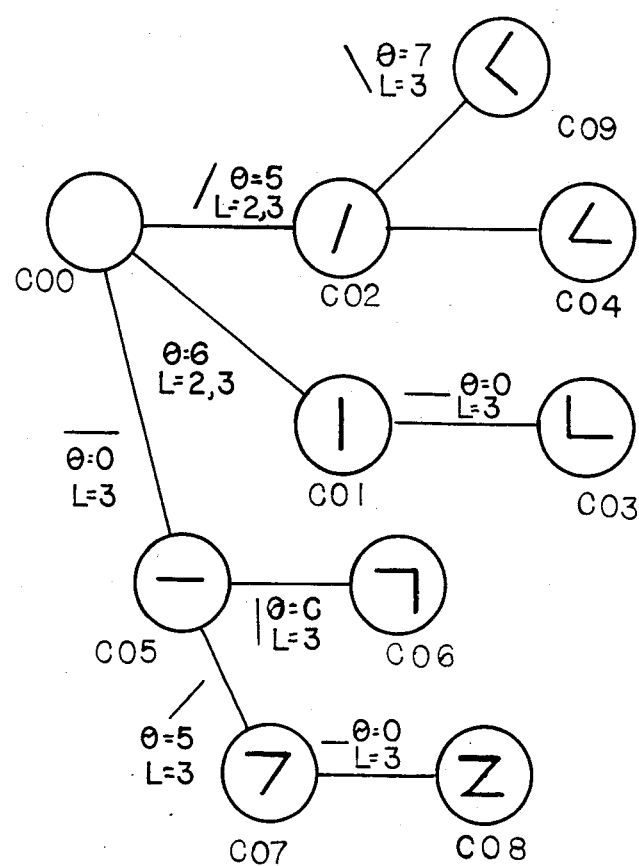
FIG. 5 illustrates an analysis of the transition of characteristic codes of strokes of characters to be recognized.

Referring to FIG. 1, there is shown a block diagram of the character recognition apparatus according to the present invention. A character, which can be an alpha-numeric character or some other mark, is described by moving a stylus pen 3 over a surface of a tablet 1. The stylus pen 3 and tablet are selected such that either or both provide information as to the relative position of the stylus and tablet such as, for example, in an XYZ coordinate system of the tablet (the Z-coordinate meaning whether the stylus pen 3 is in contact with tablet 1 or is lifted from it). Onc suitable tablet for this purpose is one supplied by Daini-Seikosha type DT-4000. Of course, the present invention is not limited to this particular type of tablet. Rather, the invention depends only upon the tablet 1/stylus pen 3 combination providing X, Y and Z information. In order to assist the user, a piece of paper 2 is attached to the writing surface of tablet 1 so that the user can see what he is drawing. As shown in the Figure, the user is drawing the numeral "4".

Outputs from the stylus pen 3/tablet 1 are coupled to an X-Y reading circuit 4. X-Y reading circuit 4 establishes the position of stylus pen 3 with respect to the surface of tablet 1. An output of X-Y reading circuit 4 is coupled to a character completion detector 5 for determining when the drawing of once character has been completed and the drawing of the next character is begun. This is done in two ways. First, a character is assumed to have a normalizing size. If stylus pen 3 is moved from the end point of one line segment further than a normal distance consistent with the character size, it is assumed that the user is moving onto a new character. Secondly, time is measured from the time the stylus pen 3 is lifted from the surface of tablet 1 until the stylus pen is replaced on the surface of the tablet. For strokes in a single character, this time will not be excessively long. However, this time is longer between the end stroke of a first character and the beginning stroke of a second. Therefore, a measurement of the time period also provides an indication of the beginning of a new character.

An output of character completion detector 5 is coupled to an X-Y coordinate memory 6. X-Y coordinate memory 6 memorizes positions of stylus pen 3 by storing its three coordinates XYZ from a time when stylus pen 3 touches paper 2 (Z=1) to a time when the stylus pen is lifted from the surface of the paper (Z=0). It is determined that a character has been written when the start of a line segment is located more than a predetermined distance on either coordinate X or coordinate Y when stylus pen 3 is on the paper (Z=1) from the end of the previous line segment. For example, it is determined that a character has been written when the pen has been shifted to a position 20 mm on either coordinate X or coordinate Y from its former position for the case wherein the character sizes 10 mm × 10 mm.

An output of X-Y coordinate memory 6 is coupled to an Xmax, Ymax detection circuit 7. This circuit detects minimum and maximum values of X and Y as accumulated in X-Y memory 6. An output of Xmax, Ymax detection circuit 7 is coupled to a character size calculation circuit 8. Character size calculation circuit 8 calculates the difference between the maximum X-value (Xmax) and the minimum X-value (Xmin) as a value A. It also calculates the difference between a maximum Y-value (Ymax) and a minimum Y-value (Ymin) as a parameter B. Thus, A and B are expressed by equations 1 and 2.

$$A = X\max - X\min \quad (1)$$

$$B = Y\max - Y\min \quad (2)$$

The size of the character is represented as A × B, each corresponding to the X and Y coordinates.

An output of character size calculation circuit 8 is coupled to a normalizing circuit 9. Normalizing circuit 9 normalizes the size of a character by transformation of the X and Y coordinates. For example, a written character can be normalized into the size of C x C corresponding to each of the X and Y coordinate axes by the following equations:

$$X' = C(X_t - X\min) \div A \quad (3)$$

$$Y' = C(Y_t - Y\min) \div B \quad (4)$$

where $X'_t$ and $Y'_t$ are transformation coordinates and the written original position is expressed by $X_t$ and $Y_t$ on the coordinate axes X and Y, respectively. Thus, a written character is normalized in size even when the character size varies from time to time. In essence, the absolute coordinates for any character in memory 6 are transformed to relative values. Normalizing circuit 9 also receives information directly from X-Y memory 6 in addition to the information processed by Xmax, Ymax detection circuit 7 and character size calculation circuit 8.

Normalizing circuit 9 provides information to a register Z10, a register X13 and a register Y16. The (t) shown in each of these three blocks in FIG. 1 represents a time t. Registers 10, 13 and 16 store the normalized or transformed values for a character as determined by normalizing circuit 9. These three register transmit their respective contents at a time t−1 to a register Z11, a register X14 and a register Y17, respectively. The FIG. 1 blocks for registers 11, 14 and 17 include a t−(1) to indicate the transfer information from registers 13 and 16 at time t−1. This transfer of information from registers 10, 13 and 16 to registers 11, 14 and 17, respectively, occurs just before new information is received from normalizing circuit 9 and stored in registers 10, 13 and 16 for the next character.

A Z differential circuit 12 is coupled to the outputs of registers 10 and 11 and determines whether stylus pen 3 position has been changed in the Z-coordinate by comparing the values from registers 10 and 11. It determines, for example, whether there has occurred a shift of the Z-coordinate from Z=1 to Z=0 or from Z=0 to Z=1 or whether the coordinate remains unchanged.

An X differential circuit 15 is coupled to outputs of X registers 13 and 14. X differential circuit 15 determines the change of X-coordinate between two points in a character in accordance with equation 5:

$$a = X'_t - X'_{t-1} \quad (5)$$

where $X'_t$ represents the content of register 13 and $X'_{t-1}$ represents the content of register 14.

A Y differential circuit 18 is coupled to outputs of Y registers 16 and 17. It determines any change b of the Y-coordinate value as expressed by equation 6:

$$b = Y'_t - Y'_{t-1} \quad (6)$$

where $Y'_t$ represents the content of register 16 and $Y'_{t-1}$ represents the content of register 17.

A line direction detecting circuit 19 is coupled to the output of Y differential circuit 18 and X differential circuit 15. Line direction detecting circuit 19 determines the line direction between two positions in one stroke of a character. In other words it decides the direction of movement of stylus pen 3 along the surface of tablet 1. The gradient θ or slope of the line between these two adjacent positions is determined by equation 7:

$$\tan\theta = b \div a \quad (7)$$

For the purpose of simplifying recognition steps, θ is classified, for example, into eight consecutive codes as shown in FIG. 2. The invention is not limited to the use of eight codes corresponding to eight directions but is only shown in the manner for simplicity. For greater resolution, the directions can be further divided into, for example, 16 or 36 different directions with corresponding 16 or 36 different codes.

Once line direction has been determined by direction detector 19, a signal carrying this information is coupled to a register 20. Register 20 provides this information in turn to a line direction differentiator 24 at a time just before it receives new θ information from direction detector 19. Direction differential circuit 24 is also coupled directly to the output of direction detector 19. Thus, direction differential circuit 24 can determine changes in gradient θ occurred during the "delay time" of register 20.

A line length detector 21 is provided with inputs from X differential circuit 15, Y differential circuit 18 and Z differential circuit 12. Detector 21 calculates line length L in accordance with equation 8:

$$L = \sqrt{a^2 + b^2} \quad (8)$$

Line length detector 21 provides a signal indicative of length L to a comparator 22 which also receives a signal from character size calculation circuit 8 indicative of character size. Comparator 22 in effect neglects any movement of stylus pen 3 when L is less than a predetermined value E which predetermined value is related to the normalized size of the character C under consideration. In such a case when the movement of the pen is neglected, Z-coordinate register 11, X-coordinate register 14 and Y-coordinate register 17 are kept unchanged. The normalized X, Y and Z coordinates observed at the next time of line position sampling are sent to registers 10 (Z), 13 (X) and 16 (Y). However, when line length L is larger than the predetermined value of E, it is assumed that a line segment is being written. The line length information L is coupled to a length adder 23 in the form of a signal from comparator 22 to the length adder 23. As stated above, direction differential circuit 24 determines in change in $\theta$ over a period of time defined by a delay through register 20. This information is coupled via a signal from direction differential circuit 24 to length adder 23. When $\theta$ is found to be unchanged, the signal to length adder 23 in effect commands length adder to add the length L of the line segment.

However, when a change of $\theta$ is observed, the $\theta$ data is provided to adder 23. The added length data is coupled from length adder 23 to a length classification circuit 26 while line length data L is coupled from comparator 22 to length adder 23. Therefore, as stylus pen 3 moves across the surface of tablet 1, length L accumulates until there is an indication of a change in gradient $\theta$. At that point, the length of the line segment is fixed and length L begins to accumulate for the next line segment at a new gradient. Line length classification circuit 26 classifies line length data L from adder 23 into one of plural categories. For example, a quarter of the normalized character size C may be used as a measure for such categories. For higher resolution, one could divide the normalized character size into more parts.

The process of extracting information as to the distinction of a stroke of a character will now be described. A stroke of the character begins when stylus pen 3 touches the surface (Z=1) of tablet 1. The stroke continues until stylus pen 3 leaves the surface of the tablet (Z=0). The circuitry for distinguishing a character includes a memory 27, preferably a read only memory (ROM), and a register 28. ROM 27 receives information from register 20 and from length classification circuit 26 and provides an output to register 28. Register 28 also receives an input from direction differential circuit 14 through an AND gate 29 which is clocked by a clock signal CK1. Register 28 provides a feedback to an input of ROM 27. Signals are coupled to register 28 in accordance with an output timing of gate 29 in accordance with the clock signal CK1 applied to it. Thus, register 28 receives information from ROM 27 when there is a coincidence of clock signal CK1 and an output from line direction differential circuit 24.

A stroke distinction signal is outputted when line direction changes. As information flows from ROM 27 to register 28, changes of line direction are stored in register 28 and the register is cleared after its contents have been transferred to a further read only memory 30. Read only memory 30 receives a signal from a relative position detector 25. Relative position detector 25 processes information from Z differential circuit 12, X differential circuit 15 and Y differential circuit 18. An output of ROM 30 is coupled to a further register 31 which provides the ultimate output signal of the character recognition device and feeds back a signal to ROM 30. Register 31 is operated by a signal from Z differential circuit 12 coupled through a gate 32 which is clocked by a clock signal CK2.

To further explain the operation of the character recognition apparatus according to the present invention, an example will be discussed. In this example, the numeral "4" is written by stylus pen 3 as illustrated by the marks written on paper 2 as shown in FIG. 1.

Referring now to FIG. 3, there is shown a numeral "4" which will be written by stylus pen on the surface of tablet 1. This numeral has component parts as will be illustrated in FIG. 4. For this example, the resolution of line direction $\theta$ is classified into eight units or categories as shown in FIG. 2. Line length L is classified into four categories including 0, 1, 2 and 3 for a normalized character size C. The relation between length code and absolute line length is set forth in the following table:

| length code | absolute line length |
|---|---|
| 0 | $L \leq 0.25\ C$ |
| 1 | $0.25\ C < L \leq 0.5\ C$ |
| 2 | $0.5\ C < L \leq 0.75\ C$ |
| 3 | $0.75\ C < L$ |

The initial stroke L shown in FIG. 4(a) constitutes the first straight line segment drawn and forming the numeral character "4". It has a gradient code $\theta=5$ by reference to FIG. 2 and a length code L=3. Continuing to refer to FIG. 4(a), the second line segment which is substantially horizontal, has a gradient code $\theta=0$ and a length code L=3. These two line segments constitute the first stroke in forming a numeral character "4". Referring now to FIG. 4(b) there is shown the second stroke in forming the numeral character "4". This stroke consists of only a single straight line segment having a gradient $\theta=6$ and a length L=2.

Referring now to FIG. 5, there is illustrated the process by which a particular character is distinguished from other characters based upon the strokes established such as was done in the FIG. 4 example.

For instance, assume a starting position C00. A first line segment having $\theta=5$ and L=3 would produce distinction C02. Once having made distinction C02, a further line segment having $\theta=7$ and L=3 would produce distinction C09. However, from distinction C02, a further line segment having $\theta=0$ and L=3 would produce distinction C04. As you can see from FIG. 5, distinctions C04 and C09 are quite different thereby identifying two different characters. Returning to starting point C00, a first line segment having $\theta=6$ and L=3 would produce distinction C01. A further line segment having $\theta=0$ and L=3 would produce distinctions C03. Returning to starting point C00, a first line segment having $\theta=0$ and L=3 would produce distinction C05. Once having made distinction C05, a further line segment of $\theta=6$ and L=3 would produce distinction C06. However, from distinction C05, a further line segment of $\theta=5$ and L=3 would produce distinction C07. After having made distinction C07, a further line segment of $\theta=0$ and L=3 would produce distinction C08. Thus, a first line segment in accordance with distinction C05 could lead to any of the characters represented by distinctions C06, C07 and C08.

To further explain the process, refer back to distinction C02 which occurs after a line segment $\theta=5$, L=3. Then, see C02 changes to C04 when a line having code $\theta=0$ and L=3 is encountered. The second distinction C04 is registered and the final distinction of that stroke is decided as C04 if Z becomes 0 before the third distinction appears. The second stroke of the numeral "4" (as shown in FIG. 4(b)) is one straight line having a designation code $\theta=6$ and L=2. The distinction for the second stroke of the numeral "4" is C01.

Referring back to FIG. 1, the character recognition is processed by read only memory 30 and register 31. The output signal of the Z-coordinate, generated upon a change from 1 to 0, and a clock signal CK2 are applied to AND gate 32.

Considering again the example of the numeral "4" as shown in FIG. 3, the first stroke corresponds to distinction C04 shown in FIG. 5 and the code corresponding to C04 would be inputted to ROM 30 and ultimately set in register 31.

The second stroke distinction C01 and the first readout data, now in register 31 would be combined. The results of that combination of two distinctions of strokes of the numeral "4" would be the combination of distinctions C01 shown in FIG. 5 and C04 shown in FIG. 5. This would result in the final recognition of the character as numeral "4".

In the character recognition apparatus, character completion detector 5 (see FIG. 1) detects completion of one character when X and Y coordinates deviate beyond predetermined value E when Z=1. The completion of a character can also be detected by measuring the passage of time during the state of Z=0 (stylus off of the tablet). Using this alternative, the completion of a character is detected when the duration for Z=0 exceeds a predetermined time.

The normalization of character size can also be achieved by normalizing the length of segment lines of strokes of a character after the length and directions of the line segments are calculated. This is in effect an alternative to calculating length and direction after transforming coordinates of lines. The process of extraction of the distinction of stroke and the later recognition of the ultimate character being drawn based on the extracted distinction can be modified to accomplish the same objective by processing all data related to direction and length of segment lines of the strokes within one complete character after having been stored in memory. The procedure of extracting character distinction and/or character recognition can be accomplished by a microcomputer or some special purpose electronic device other than the combination of ROM 30 and register 31 shown in FIG. 1. Using the character recognition apparatus of the present invention, the character is recognized substantially in real time without utilizing complicated software programs.

While the invention has been described in connection with what is presently considered to be the most practical and preferred embodiments, it is to be understood that the invention is not to be limited to the disclosed embodiments but on the contrary is intended to cover various modifications and equivalent arrangement included within the spirit and scope of the appended claims which scope is to be accorded the broadest interpretation so as to encompass all such modifications and equivalent structures.

We claim:

1. A character recognition apparatus for identifying a character from data in detecting the positional movement of a stylus with respect to a tablet defining relative position with detection means in terms of X, Y and Z coordinate axes, comprising:

detection circuit means for detecting the initiation and completion of the movement of said pen for writing said character by detecting a change of the position of the pen on the Z-coordinate axis normal to the surface of the tablet and by comparing the difference of two pen positions in the plane of the X and Y axes before and after the change of the pen position;

character size normalizing circuit means for normalizing the size of written characters by processing said data according to the following equations:

$$X' = C(X_t - X\min) \div A \qquad (1)$$

$$Y' = C(Y_t - Y\min) \div B \qquad (2)$$

where A represents a maximum shift of the pen along the X-axis and B represents the maximum shift of the pen along the Y-coordinate axis, C is a desired character size after normalization, $X'_t$, $Y_t$ are coordinates of the pen position on the X and Y axes, respectively, Xmin, Ymin are the minimum value of the position of the pen for writing one character on the X and Y axes, respectively, and X' and Y' are transformed coordinates after the normalization;

calculating circuit means for calculating gradient $\theta$ and length L of a line segment of a stroke of a character by processing data on the pen position upon writing according to the following equations:

$$A = X'_t - X'_{t-1} \qquad (3)$$

$$B = Y'_t - Y'_{t-1} \qquad (4)$$

$$\text{Tan}\theta = B \div A \qquad (5)$$

$$L = \sqrt{a^2 + b^2} \qquad (8)$$

where $X'_t$, $X'_{t-1}$ are transformed X-coordinates taken at the time t, and t−1, respectively, and $Y'_t$, $Y'_{t-1}$ are also transformed Y-coordinates taken at times t and t−1;

determination means for extracting distinction of a stroke of a character by order of occurrence of $\theta$ and L of line segment(s) of a stroke; and character recognition circuit means for recognizing character by combination in terms of the order or occurrence of the distinctions of strokes.

2. A character recognition apparatus according to claim 1 wherein each said gradient $\theta$ of segment line of a stroked is classified into plural categories and a designation code is given to each of the gradients.

3. A character recognition apparatus according to claim 1 wherein said length of a segment line of a stroke is classified into plural categories according to the normalizing size of character to be recognized and is provided with a specific code to each of the category of line length.

* * * * *